United States Patent
Lavid Ben Lulu et al.

(10) Patent No.: US 11,822,323 B2
(45) Date of Patent: Nov. 21, 2023

(54) PROVIDING CORRECTIVE SOLUTION RECOMMENDATIONS FOR AN INDUSTRIAL MACHINE FAILURE

(71) Applicant: SKF AI, Ltd., Yoqneam (IL)

(72) Inventors: David Lavid Ben Lulu, Nesher (IL); Waseem Ghrayeb, Nazareth Illit (IL)

(73) Assignee: AKTIEBOLAGET SKF, Gothenburg (SE)

( * ) Notice: Subject to any disclaimer, the term of this patent is extended or adjusted under 35 U.S.C. 154(b) by 91 days.

(21) Appl. No.: 17/163,920

(22) Filed: Feb. 1, 2021

(65) Prior Publication Data
US 2021/0157309 A1  May 27, 2021

Related U.S. Application Data

(63) Continuation of application No. PCT/US2019/046121, filed on Aug. 12, 2019.
(Continued)

(51) Int. Cl.
*G05B 23/02* (2006.01)

(52) U.S. Cl.
CPC ..... *G05B 23/0283* (2013.01); *G05B 23/0267* (2013.01); *G05B 23/0281* (2013.01); *G05B 23/0297* (2013.01)

(58) Field of Classification Search
CPC ............ G05B 23/0283; G05B 23/0267; G05B 23/0281; G05B 23/0297
See application file for complete search history.

(56) References Cited

U.S. PATENT DOCUMENTS

| | | | |
|---|---|---|---|
| 6,567,709 B1 * | 5/2003 | Malm | G05B 23/0267 700/169 |
| 2002/0091972 A1 | 7/2002 | Harris et al. | |

(Continued)

FOREIGN PATENT DOCUMENTS

| | | |
|---|---|---|
| CN | 101107594 A | 1/2008 |
| CN | 107045335 A | 8/2017 |

(Continued)

OTHER PUBLICATIONS

The International Search Report and The Written Opinion for of the International Searching Authority for PCT/US2019/046121, dated Dec. 12, 2019, ISA/RU, Moscow, Russia.
(Continued)

Primary Examiner — Manuel A Rivera Vargas
(74) Attorney, Agent, or Firm — M&B IP Analysts, LLC

(57) ABSTRACT

A system and method for providing a corrective solution recommendation for an industrial machine failure, the method including: monitoring a plurality of segments of at least an industrial machine behavioral model to identify a first segment having at least a first set of characteristics associated with a previous machine failure; determining a corrective solution recommendation that solved the previous machine failure; identifying at least a second set of characteristics associated with a second segment; and generating a notification comprising the corrective solution recommendation when the second set of characteristics is determined to be similar to the first set of characteristics above a predetermined threshold.

17 Claims, 4 Drawing Sheets

Related U.S. Application Data

(60) Provisional application No. 62/719,733, filed on Aug. 20, 2018.

(56) References Cited

U.S. PATENT DOCUMENTS

| | | | |
|---|---|---|---|
| 2004/0025082 A1 | 2/2004 | Roddy et al. | |
| 2006/0161819 A1* | 7/2006 | Nissan-Messing | G06F 11/0793 714/48 |
| 2006/0168475 A1 | 7/2006 | Segers et al. | |
| 2009/0096405 A1* | 4/2009 | Flickinger | G01R 31/343 702/183 |

FOREIGN PATENT DOCUMENTS

| | | |
|---|---|---|
| CN | 107436595 A | 12/2017 |
| CN | 108229704 A | 6/2018 |
| WO | 2017116627 A1 | 7/2017 |

OTHER PUBLICATIONS

The First Chinese Foreign Office Action for Chinese Application No. 201980054790.2, The Chinese National Intellectual Property Administration (CNIPA), Beijing City, China, dated Mar. 24, 2022.

* cited by examiner

PROVIDING CORRECTIVE SOLUTION RECOMMENDATIONS FOR AN INDUSTRIAL MACHINE FAILURE

CROSS-REFERENCE TO RELATED APPLICATIONS

This application is a continuation of International Application No. PCT/US2019/046121, filed Aug. 12, 2019, which claims the benefit of U.S. Provisional Application No. 62/719,733 filed on Aug. 20, 2018, the contents of which are hereby incorporated by reference.

TECHNICAL FIELD

The present disclosure relates generally to maintenance systems for machines, and more specifically to monitoring machine operations for improving machine processes.

BACKGROUND

Communications, processing, cloud computing, artificial intelligence, and other computerized technologies have advanced significantly in recent years, heralding in new fields of technology and production. Further, many of the industrial technologies employed since or before the 1970s are still in use today. Existing solutions related to these industrial technologies have often seen only minor improvements, merely increasing production and yield slightly.

In modern manufacturing practices, manufacturers must often meet strict production timelines and provide flawless or nearly flawless production quality. As a result, these manufacturers risk heavy losses whenever an unexpected machine failure occurs. A machine failure is an event that occurs when a machine deviates from correct service. Errors, which are typically deviations from the correct state of the machine, are not necessarily failures, but may lead to and indicate potential future failures. Besides failures, errors may otherwise cause unusual machine behavior that may affect performance.

The average failure-based machine downtime for typical manufacturers (i.e., the average amount of time in which production is shuts down, either in part or in whole, due to a machine failure) is 17 days per year, i.e., 17 days of lost production and, hence revenue. In the case of a typical 450 megawatt power turbine, for example, a single day of downtime can cost a manufacturer over $3 million US in lost revenue. Such downtime may have additional costs related to repair, safety precautions, and the like.

In energy power plants, billions of US dollars are spent annually on ensuring reliability. Specifically, billions of dollars are spent on backup systems and redundancies utilized to minimize production downtimes. Additionally, monitoring systems may be utilized to identify failures quickly, thereby speeding up a return to production when downtime occurs. However, existing monitoring systems typically identify failures only after or immediately before downtime begins.

Further, existing solutions for monitoring machine failures typically rely on a set of predetermined rules for each machine. These rules sets do not account for all data that may be collected with respect to the machine, and are only used for checking particular key parameters while ignoring the rest. Moreover, these rule sets must be provided in advance by engineers or other human analysts. As a result, only some of the collected data may be actually used by existing solutions, thereby resulting in wasted use of computing resources related to the transmission, storage, and processing of unused data. Further, failure to consider all relevant data may result in missed or otherwise inaccurate determination or prediction of failures.

Additionally, existing solutions often rely on periodic testing at predetermined intervals. Thus, even existing solutions that can predict failures in advance typically return requests to perform machine maintenance even when the machine is not in immediate condition of failure. Such premature replacement and maintenance results in wasted materials and expenses spent replacing parts that are still functioning properly. Further, such existing solutions often result in initiating repairs only after failure occurs. As a result, failures may not be prevented, resulting in down time and lost revenue.

Furthermore, existing monitoring and maintenance solutions often require dedicated testing equipment. Consequently, these solutions typically require specialized operators who are well-trained in the operation of each monitoring and maintenance system. Requiring specialized operators can be inconvenient and costly, and may introduce potential sources of human error. Additionally, given the sheer amount of data that may be collected for any given machine in addition to minute fluctuations in data, a human analyst is not capable of adequately determining upcoming failures.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "certain embodiments" may be used herein to refer to a single embodiment or multiple embodiments of the disclosure.

Certain embodiments disclosed herein include a method for providing a corrective solution recommendation for an industrial machine failure, including: monitoring a plurality of segments of at least an industrial machine behavioral model to identify a first segment having at least a first set of characteristics associated with a previous machine failure; determining a corrective solution recommendation that solved the previous machine failure; identifying at least a second set of characteristics associated with a second segment; and generating a notification comprising the corrective solution recommendation when the second set of characteristics is determined to be similar to the first set of characteristics above a predetermined threshold.

Certain embodiments disclosed herein also include a non-transitory computer readable medium having stored thereon instructions for causing a processing circuitry to perform a process, the process including: monitoring a plurality of segments of at least an industrial machine behavioral model to identify a first segment having at least a first set of characteristics associated with a previous machine failure; determining a corrective solution recommendation that solved the previous machine failure; identifying at least a second set of characteristics associated with a second segment; and generating a notification comprising the corrective solution recommendation when the second set of characteristics is determined to be similar to the first set of characteristics above a predetermined threshold.

Certain embodiments disclosed herein also include a system for providing a corrective solution recommendation for an industrial machine failure, including: a processing circuitry; and a memory, the memory containing instructions that, when executed by the processing circuitry, configure the system to: monitor a plurality of segments of at least an industrial machine behavioral model to identify a first segment having at least a first set of characteristics associated with a previous machine failure; determine a corrective solution recommendation that solved the previous machine failure; identify at least a second set of characteristics associated with a second segment; and generate a notification comprising the corrective solution recommendation when the second set of characteristics is determined to be similar to the first set of characteristics above a predetermined threshold.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
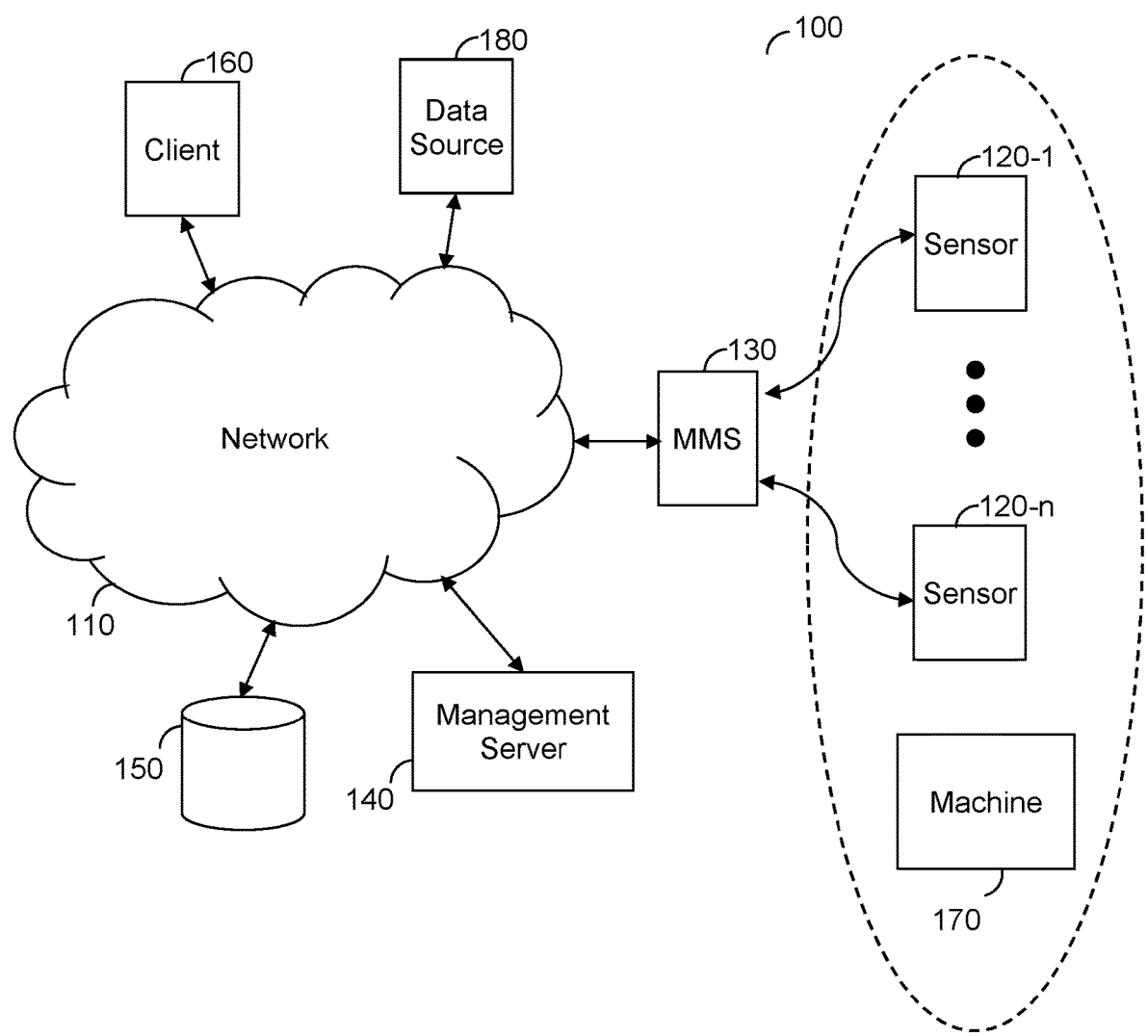
FIG. 1 is a network diagram utilized to describe the various disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing corrective solution recommendations for a machine failure. After collecting from a first industrial machine behavioral model (hereinafter a machine industrial behavioral model) a first set of characteristics that indicates a previous machine failure, a first corrective solution used for solving the previous machine failure is collected. The first set of characteristics is then associated with the corresponding corrective solution recommendation and stored in a database. Thereafter, a second machine behavioral model is monitored for determining whether a second set of characteristics of the second machine behavioral model is similar above a predetermined threshold to the first set of characteristics. Based on a determination that the similarity between the second and the first set of characteristics crosses the threshold, a notification that includes a corrective solution recommendation that is associated with the first corrective solution used for solving the previous machine failure is sent to a client device that is associated with a machine to which the second machine behavioral model is related.

FIG. 1 shows an example network diagram 100 utilized to describe the various disclosed embodiments. The example network diagram 100 includes a machine monitoring system (MMS) 130, a management server 140, a database 150, a client device 160, and a data source 180 connected through a network 110. The example network diagram 100 further includes a plurality of sensors 120-1 through 120-$n$ (hereinafter referred to individually as a sensor 120 and collectively as sensors 120, merely for simplicity purposes, where n is an integer equal to or greater than 1), connected to the machine monitoring system 130. The network 110 may be, but is not limited to, a wireless network, a cellular or wired network, a local area network (LAN), a wide area network (WAN), a metro area network (MAN), the Internet, the worldwide web (WWW), similar networks, and any combination thereof.

The client device 160 may be, but is not limited to, a personal computer, a laptop, a tablet computer, a smartphone, a wearable computing device, a log, a data source (e.g. database), or any other device capable of receiving and/or displaying notifications indicating maintenance and failure timing predictions, results of supervised analysis, unsupervised analysis of machine operation data, and the like.

The sensors 120 are located in proximity (e.g., physical proximity) to a machine 170. The machine 170 may be any machine for which performance can be represented via sensory data including an industrial machine used in industrial settings, but not limited to, a turbine, an engine, a welding machine, a three-dimensional (3D) printer, an injection molding machine, a combination thereof, a portion thereof, and the like. Each sensor 120 is configured to collect sensory inputs such as, but not limited to, sound signals, ultrasound signals, light, movement tracking indicators, temperature, energy consumption indicators, and the like based on operation of the machine 170. The sensors 120 may include, but are not limited to, sound capturing sensors, motion tracking sensors, energy consumption meters, temperature meters, and the like. Any of the sensors 120 may be, but are not necessarily, communicatively or otherwise connected to the machine 170 (such connection is not illustrated in FIG. 1 merely for the sake of simplicity and without limitation on the disclosed embodiments).

It should be noted that multiple machines, such as the machine 170, may be connected via the network 110 to the management server 140.

The sensors 120 are communicatively connected to the MMS 130. The MMS 130 may be configured to store and to preprocess raw sensory inputs received from the sensors 120. Alternatively, or collectively, the MMS 130 may be configured to periodically retrieve collected sensory inputs stored in, for example, the database 150. The preprocessing may include, but is not limited to, data cleansing, normalization, rescaling, re-trending, reformatting, noise filtering, a combination thereof, and the like.

The management server 140, typically comprising at least a processing circuitry (not shown) and a memory (not shown), the memory contains therein instructions that when executed by the processing circuitry configures the management server 140 as further described herein below. According to an embodiment of the disclosure, the instructions stored in the memory are those that configure the system 100 to perform the method described herein below. The memory may contain also data collected by the sensors 120, however, such data may also be stored in a data warehouse such as the database 150, where in certain embodiments the memory of the management server 140 stores into or retrieves therefrom data and/or instructions.

The data source 180 may be a server, a data warehouse, a website, a cloud database, and the like. The data source 180 may be configured to store one or more corrective solution recommendations that were utilized to solve or mitigate machine failures that previously occurred.

In an embodiment, the management server 140 is configured to monitor a plurality of machine behavioral models. Each machine behavioral model may be associated with a machine (e.g., the machine 170). A machine behavioral model may be represented by, for example, a graph aggregating a plurality of sensory inputs that are associated with a plurality of components of a machine and/or processes executed by a machine. In a further embodiment, the machine behavioral model may be represented by meta-models, where each meta-model is associated with a component of the machine. The meta-models are models that are generated from one or more machine learning models and take into account prior data. They are based on the indicative sensory inputs related to their respective components, and may be utilized to identify anomalies in the operation of each respective component of the machine. In a further embodiment, a machine behavioral model may be divided to a plurality of segments. The segments may be determined by time frames, starting point and ending point of at least an abnormal operational behavior of at least a component of the machine represented by the graph, and the like.

In an embodiment, the management server 140 is configured to identify from at least a first segment of at least a first machine behavioral model of the plurality of machine behavioral models at least a first set of characteristics associated with a previous machine failure. The first set of characteristics may include for example, features of the sensory inputs, anomalies occurred during or prior to the previous machine failure, statistical metrics, correlation between sensory inputs during or prior to the previous machine failure, machine behavior patterns during or prior to the previous machine failure, root cause, and the like. In an embodiment, the first set of characteristics may be utilized to predict new forthcoming machine failures and/or identify machine failures as further described herein below.

In an embodiment, the management server 140 is configured to determine, e.g., based on data retrieved from a data source (e.g. the data source 180), at least a first corrective solution recommendation that is associated with a corrective solution that solved the previous machine failure. The previous machine failure may have occurred in the machine associated with the machine behavioral model being monitored, or a machine determined to be similar to such a machine above a predetermined threshold. As a non-limiting example, the first corrective solution recommendation may indicate that an exhaust pipe of the machine 170 should be replaced with a new exhaust pipe to avoid failure.

As further discussed herein above, the data source 180 may be, for example, a server, a data warehouse, and the like, of a factory that is configured to collect and store corrective solution recommendations associated with corrective solutions that were previously determined to be useful for solving machine failures that occurred during the operation of one or more machines. The collection of the first corrective solution recommendation may be achieved using, for example, an identifier allowing for the determination of which corrective solution recommendation relates to which collected machine failure characteristics.

In an embodiment, the identifier may be a time frame at which a machine failure occurred, such that the characteristics associated with the machine failure as well as the corrective solution recommendation, may have the same, or similar, time frame. Therefore, a certain corrective solution recommendation may be identified as associated with one or more characteristics. In an example scenario, an abnormal behavior was identified in a first machine behavioral model at 10:07 AM and at 10:08 AM, one minute later, a corrective solution recommendation was recorded by a server. According to the same example, the characteristic, i.e., the abnormal behavior, and the corrective solution recommendation happened in a similar time frame. In an embodiment, a similar time frame may be determined based on a predetermined threshold, such that, e.g., occurrences within an interval of 10:00 minutes may be considered as the same time frame and occurrences within 10:01 minutes or more may be considered as a different time frame.

In an embodiment, the management server 140 is configured to store in a database (e.g., the database 150) the first set of characteristics with the at least a first corrective solution recommendation that is related thereto. That is, the first set of characteristics that indicates a previous machine failure is associated with the corrective solution recommendation that had been used for solving the previous machine failure, and both of the first set of characteristics and the corrective solution recommendation are stored in the database 150 for future use.

In an embodiment, the management server 140 is configured to identify at least a second set of characteristics associated with a second segment of the at least a first machine behavioral model. The second segment may comprise at least a second set of characteristics. It should be noted that the monitoring may be executed on a second segment of the same machine behavioral model, i.e., the first machine behavioral model, and it may also be executed on a segment of a second machine behavioral model, a third machine behavioral model, and so on. The second set of characteristics may include for example, features of the sensory inputs allowing for the prediction or identification of machine failures, anomalies in the sensory inputs, correlations between sensory inputs, machine behavior patterns, and the like. Monitoring the at least a second segment allows the management server 140 to detect and determine similarities, if they exist, between the second set of characteristics of the second segment and the first set of characteristics of the first segment, that indicate a machine failure and that was previously associated with a corresponding corrective solution recommendation.

In an embodiment, the management server 140 is configured to determine whether the second set of characteristics is similar above a predetermined threshold to the at least a first set of characteristics that was stored in the database 150. In an embodiment, the determination may be achieved using a similarity function, which is a function that provides a quantitative value representing the similarity between the two sets of characteristics. The determination may be achieved by comparing the second set of characteristics to the at least a first set of characteristics.

According to another embodiment, the determination may be achieved using one or more machine learning models. The threshold may be a predetermined indicator that, when reached, indicates that the second set of characteristics and the first set of characteristics are similar enough such that it can be determined if, for example, the same machine failure is currently occurring, the same machine failure is about to occur, or the same machine failure has occurred. As a non-limiting example, the threshold may require that the maximum values of the sensory inputs of the second segment and of the first segment will be identical. As another non-limiting example, the threshold may require that the intervals between two abnormal behaviors will be less than one minute. As another non-limiting example, the threshold may require that at least two of the monitored components are identical. It should be noted that the similarity between the first segment and the second segment may indicate that the second segment also indicates a machine failure or a forthcoming machine failure. That is, upon determination that the similarity exceeds the threshold, at least one forthcoming machine failure may be predicted.

In an embodiment, after determining that the threshold was crossed, the management server 140 is configured to extract from the database 150 the at least a first corrective solution recommendation. For example, after determining that a second segment of a second machine behavioral model is similar above a predetermined threshold to a first segment of a first machine behavioral model that was determined to be indicative of a machine failure and was associated with an efficient corrective solution, a corrective solution recommendation that is associated with the corrective solution that was previously determined to be efficient is extracted for future use.

In an embodiment, the management server 140 is configured to send to a client device (e.g. the client device 160) a notification comprising the at least a first corrective solution recommendation. The client device 160 to which the notification is sent is associated with a machine (e.g. the machine 170) at which the at least a forthcoming machine failure was identified or predicted. The notification may include, for example, a recommendation of how to prevent a forthcoming machine failure, how to solve an identified machine failure, and the like. In a further embodiment, the notification may include information, such as but not limited to, time to failure, machine failure root cause, evolution of degradation events, information related to previous machine failures, and the like. In a further embodiment, before sending the notification, the management server 140 is configured to adjust the corrective solution recommendation based on, for example, the machine type, machine characteristics, the second set of characteristics of the at least a second segment, a combination thereof, and the like.

In an embodiment, the management server 140 is configured to determine a suitability score for the at least a first corrective solution recommendation and the identified forthcoming machine failure. That is, the suitability score may indicate on a probability that the corrective solution recommendation that successfully solved the first machine failure shall solve a forthcoming machine failure and/or an existing machine failure.

Figure 2:
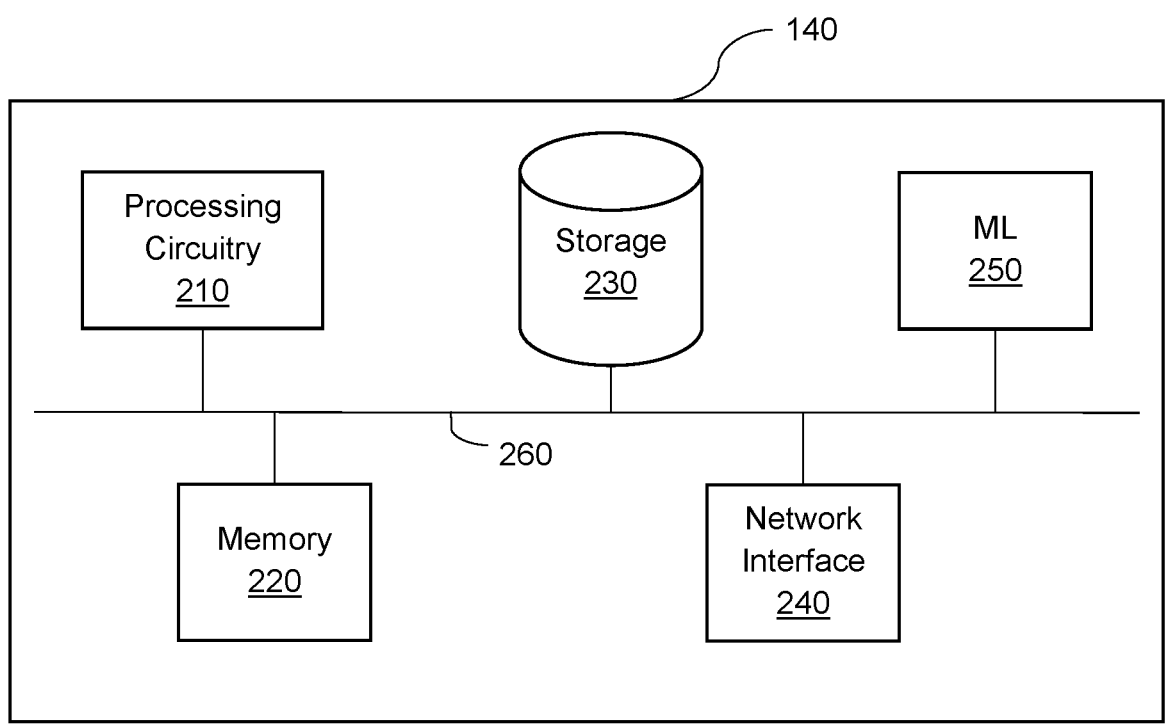
FIG. 2 is a schematic diagram of a management server system according to an embodiment.

FIG. 2 shows an example block diagram of the management server 140 implemented according to one embodiment. The management server 140 includes a processing circuitry 210 coupled to a memory 220, a storage 230, a network interface 240, and a machine learning (ML) processor 250. In an embodiment, the components of the management server 140 may be communicatively connected via a bus 260.

The processing circuitry 210 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 220 may be volatile (e.g., RAM), non-volatile (e.g., ROM or flash memory), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein.

The storage 230 may be magnetic storage, solid state storage, optical storage, and the like, and may be realized, for example, as flash memory or other memory technology, CD-ROM, Digital Versatile Disks (DVDs), or any other medium which can be used to store the desired information.

The network interface 240 allows the management server 140 to communicate with the machine monitoring system 130 for the purpose of, for example, receiving raw and/or preprocessed sensory inputs. Additionally, the network interface 240 allows the management server 140 to communicate with the client device 160 in order to send, e.g., notifications related to anomalous activity, machine failure prediction, corrective solution recommendations, and the like.

The machine learning processor 250 is configured to perform machine learning based on sensory inputs received via the network interface 240 as described further herein. In an embodiment, the machine learning processor 250 is further configured to determine, based on one or more machine learning models, predictions for failures of the machine 170. In a further embodiment, the machine learning processor 250 is also configured to determine at least one recommendation for avoiding or mitigating the determined predicted failures. As a non-limiting example, the at least one recommendation may indicate that an exhaust pipe on the machine 170 should be replaced with a new exhaust pipe to avoid failure. The machine learning model may be utilized for identifying similarity between a first set of characteristics and at least a second set of characteristics that may be indicative of a machine failure and/or a forthcoming machine failure.

It should be understood that the embodiments described herein are not limited to the specific architecture illustrated in FIG. 2, and other architectures may be equally used without departing from the scope of the disclosed embodiments.

Figure 3:
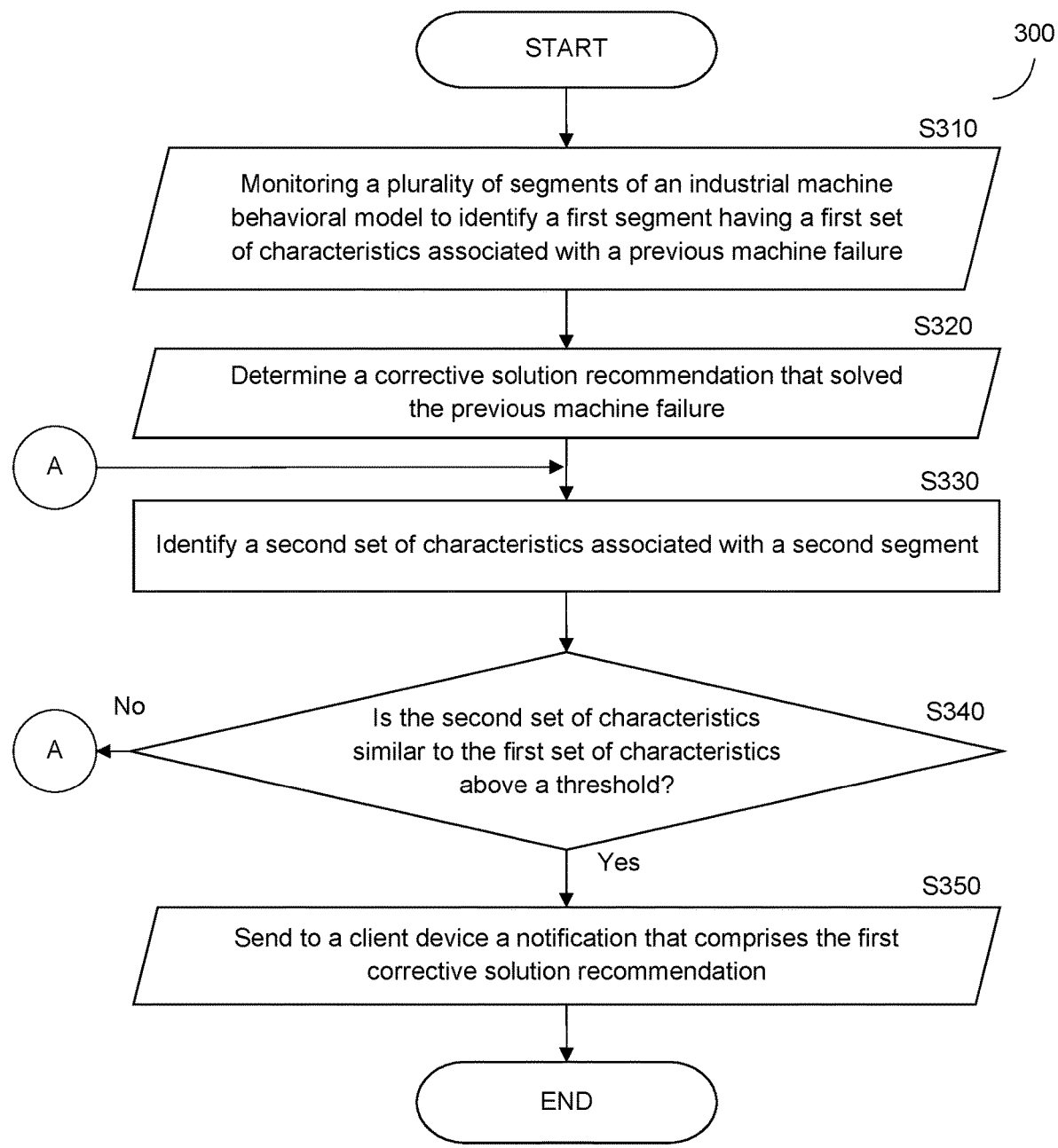
FIG. 3 is a flowchart illustrating a method for providing a corrective solution recommendation for a machine failure according to an embodiment.

FIG. 3 is an example flowchart 300 illustrating a method for providing corrective solution recommendations for a machine failure according to an embodiment.

At S310, a plurality of segments of at least an industrial machine behavioral model is monitored to identify a first segment having at least a first set of characteristics associated with a previous industrial machine failure. The first set of characteristics are various parameters of the industrial machine that are associated with the previous failure. In an embodiment, S310 may further include monitoring a plurality of machine behavioral models for collecting characteristics that are related to multiple machines failure that previously occurred.

At S320, a corrective solution recommendation associated with at least a corrective solution that previously solved the first machine failure is determined. The corrective solution recommendation may be previously stored and retrieved from a data source (e.g. the data source 180 of FIG. 1). The data source may be, for example, a server, a data warehouse, and the like, that is configured to collect and store corrective solution recommendations that were previously determined to be useful for solving machine failures occurred during the operation of one or more machines. It should be noted that several corrective solutions may be incorporated for solving a single forthcoming machine failure, or an existing machine failure, such that the corrective solution recommendation may include a single corrective solution or a plurality of corrective solutions. According to another embodiment, the corrective solution recommendation may also include one or more ineffective solutions. Ineffective solutions are corrective solutions that were used in similar previous cases, i.e., in similar previous machine failures, but were not effective for the purpose of solving the similar previous machine failure.

At S330, at least a second segment of a machine behavioral model having at least a second set of characteristics is identified. It should be noted that the second set of characteristics may be identified from a second segment of the same machine behavioral model, i.e., the first machine behavioral model, and it may also be executed on a segment of a second, third, and the like, machine behavioral models. Identifying the at least a second segment allows for the detection if any similarities exist between the second set of characteristics and the first set of characteristics that indicate a machine failure.

At S340, it is checked whether the second set of characteristics is similar above a threshold to the first set of characteristics, and if so, execution continues with S350; otherwise, execution continues with S330. When determining that the similarity exceeds the threshold, at least a forthcoming machine failure is identified. In an embodiment, the similarity may also indicate that a machine failure that already occurred is similar to a previously analyzed machine failure. In a further embodiment, the similarities are determined to be above a predetermined threshold based on a similarity function that provides a quantitative value representing the similarity between the two sets of characteristics. In yet a further embodiment, the similarities are determined based on machine learning models.

At S360, a notification that comprises the first corrective solution recommendation is generated and optionally sent to a client device (e.g., the client device 160 of FIG. 1). The client device is associated with a machine (e.g. the machine 170 of FIG. 1) in which the at least a forthcoming machine failure was identified. For example, a client device such as a smartphone is communicatively connected to a machine that has an associate machine behavioral model being monitored, and upon identification of a forthcoming machine failure, or a machine failure that has already occurred, a notification is sent to the smartphone. According to the same example, the notification may include a suggested solution for solving the machine failure. In a further embodiment, S360 may include extraction of the first corrective solution recommendation from the database upon determination that the threshold was crossed, i.e., that the similarity between the first set of characteristics and the second set of characteristics exceeds the threshold.

Figure 4A:
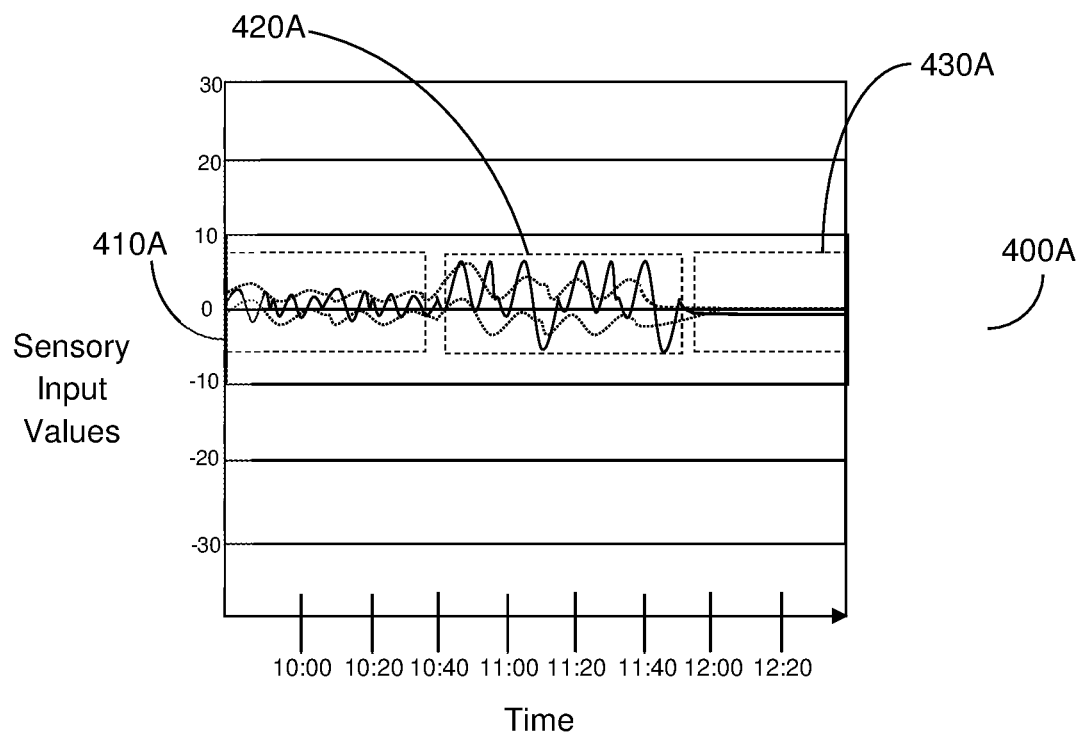
FIG. 4A is an example simulation illustrating a collection of a first set of characteristics from an industrial machine behavioral model according to an embodiment.

FIG. 4A is an example simulation 400A illustrating the collection of a first set of characteristics from a first machine behavioral model. The segment 410A shows normal behavior of a first machine. That is, the sensory inputs are positioned within a predetermined normal range that indicates that the machine operation is normal. The segment 420A shows abnormal machine behavior. The abnormal machine behavior is represented by abnormal values of the sensory inputs with respect to the normal machine behavior shown in segment 410A. The sensory inputs shown in segment 420A may indicate on, for example, a high pressure in a gas pipe of a machine, on a relatively high energy consumption, and a relatively low oil pressure. The segment 430A shows a machine downtime, following the abnormal behavior, in which the machine is not functional. The first set of characteristics may be collected from the segment 420A. Thereafter, the corrective solution recommendation that relates to the corrective solution that solved the machine failure is stored in a database together with the first set of characteristics that indicate on the machine failure. As a non-limiting example, the first corrective solution recommendation may indicate that an exhaust pipe of the machine should be replaced with a new exhaust pipe to avoid failure. The collection of the first set of characteristics and the association of the characteristics with the related corrective solution recommendation allows to use the collected characteristics and the solutions in future cases, such as the one shown in FIG. 4B, for identifying in time machine failures and suggest a suitable corrective solution that already solved a similar machine failure in the past.

Figure 4B:
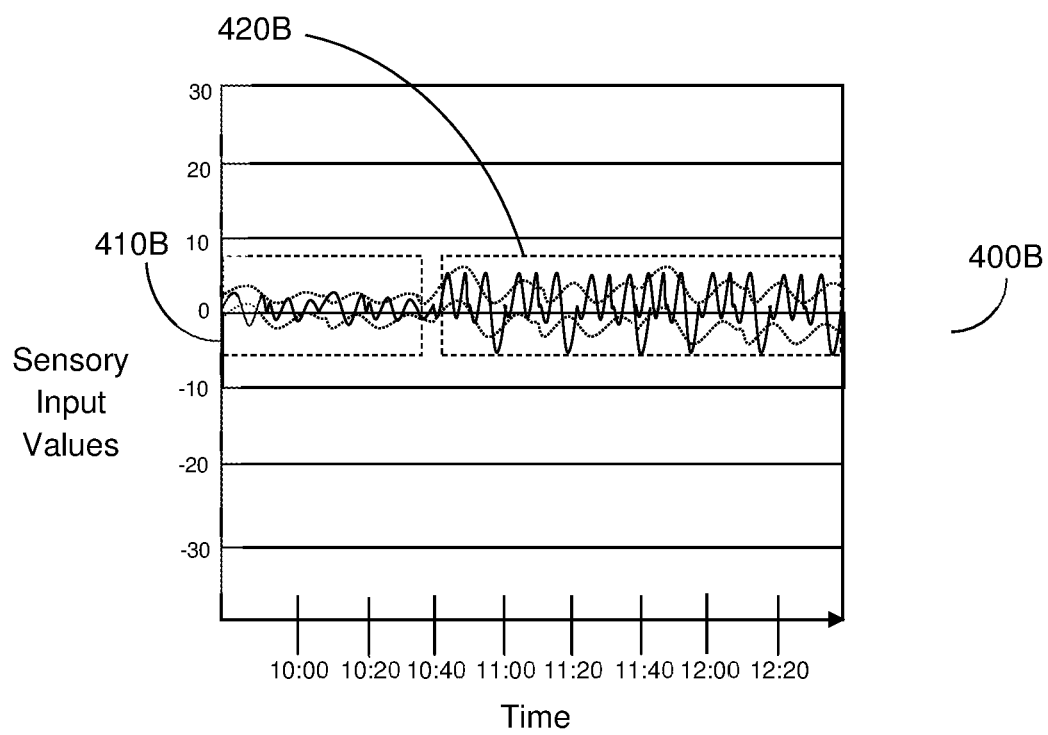
FIG. 4B is an example simulation illustrating monitoring of a second segment of an industrial machine behavioral model that comprises a second set of characteristics according to an embodiment.

FIG. 4B is an example simulation 400B illustrating monitoring of a second segment of a machine behavioral model that comprises a second set of characteristics. The segment 410B shows normal behavior of a second machine. That is, the sensory inputs are positioned within a normal range that indicates that the machine operation is normal. The segment 420B shows abnormal machine behavior. The abnormal machine behavior is represented by abnormal values of sensory inputs with respect to the normal machine behavior shown in segment 410B. The sensory inputs shown in segment 420B may indicate on a high pressure in a gas pipe of a machine, on a relatively high energy consumption, and a relatively low oil pressure. That is, the three abnormal sensory inputs values, that were identified in segment 420A of the first machine behavioral model prior the first machine failure are also exist in segment 420B of the second machine behavioral model. Therefore, the corrective solution recommendation that is associated with the corrective solution that solved the first machine failure, shall be sent to a client device associated with the second machine in order to prevent the forthcoming machine failure. It should be noted that the abnormal sensory inputs values are at least a portion of the characteristics by which the management server 140 is able to determine whether segment 420A and segment 420B have characteristics that are similar above a threshold. Other characteristics may be for example the time frame of an abnormal behavior, the number of the sensors that indicated on abnormal behaviors, patterns, and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices.

The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing a corrective solution recommendation for an industrial machine failure, comprising:
   monitoring a plurality of segments of at least a first industrial machine behavioral model to identify a first segment having at least a first set of characteristics associated with a previous industrial machine failure;
   determining a corrective solution recommendation that solved the previous industrial machine failure;
   identifying at least a second set of characteristics associated with a second segment, wherein the second set of characteristics is of a second industrial machine behavioral model associated with a machine;
   generating a notification comprising the corrective solution recommendation when the second set of characteristics is determined to be similar to the first set of characteristics above a predetermined threshold; and
   sending, to a client device associated with the machine to which the second industrial machine behavioral model is associated, the generated notification.

2. The method of claim 1, wherein the first set of characteristics and the second set of characteristics are indicative of at least one of: a feature, an anomaly, a statistical metric, a correlation between sensory inputs, a machine behavior patterns, and a root cause.

3. The method of claim 1, wherein the previous industrial machine failure is a first industrial machine failure, wherein the first set of characteristics allows for the detection of a second industrial machine failure by detecting abnormal behaviors of at least a component of the machine.

4. The method of claim 1, wherein the notification includes at least one of: time to failure, industrial machine failure root cause, evolution of degradation events, information related to previous industrial machine failure.

5. The method of claim 1, further comprising:
   determining a suitability score for the corrective solution recommendation, wherein the suitability score indicates a probability that the corrective solution recommendation will solve a forthcoming or existing second industrial machine failure.

6. The method of claim 1, wherein the second set of characteristics is determined to be similar to the first set of characteristics above a predetermined threshold based on a similarity function that provides a quantitative value representing the similarity between the two sets of characteristics.

7. The method of claim 1, wherein the at least a first industrial machine behavioral model is represented by a plurality of meta-models, where each of the plurality of meta-models is associated with a component of an industrial machine.

8. The method of claim 1, wherein the second set of characteristics is determined to be similar to the first set of characteristics using machine learning models.

9. A non-transitory computer readable medium having stored thereon instructions for causing a processing circuitry to perform a process, the process comprising:
   monitoring a plurality of segments of at least a first industrial machine behavioral model to identify a first segment having at least a first set of characteristics associated with a previous industrial machine failure;
   determining a corrective solution recommendation that solved the previous industrial machine failure;
   identifying at least a second set of characteristics associated with a second segment, wherein the second set of characteristics is of a second industrial machine behavioral model associated with a machine;
   generating a notification comprising the corrective solution recommendation when the second set of characteristics is determined to be similar to the first set of characteristics above a predetermined threshold; and
   sending, to a client device associated with the machine to which the second industrial machine behavioral model is associated, the generated notification.

10. A system for providing a corrective solution recommendation for an industrial machine failure, comprising:
    a processing circuitry; and
    a memory, the memory containing instructions that, when executed by the processing circuitry, configure the system to:
    monitor a plurality of segments of at least a first industrial machine behavioral model to identify a first segment having at least a first set of characteristics associated with a previous industrial machine failure;
    determine a corrective solution recommendation that solved the previous industrial machine failure;
    identify at least a second set of characteristics associated with a second segment, wherein the second set of characteristics is of a second industrial machine behavioral model associated with a machine;
    generate a notification comprising the corrective solution recommendation when the second set of characteristics is determined to be similar to the first set of characteristics above a predetermined threshold; and send, to a client device associated with the machine to which the second industrial machine behavioral model is associated, the generated notification.

11. The system of claim 10, wherein the first set of characteristics and the second set of characteristics are indicative of at least one of: a feature, an anomaly, a statistical metric, a correlation between sensory inputs, a machine behavior patterns, and a root cause.

12. The system of claim 10, wherein the previous industrial machine failure is a first industrial machine failure, wherein the first set of characteristics allows for the detection of a second industrial machine failure by detecting abnormal behaviors of at least a component of the machine.

13. The system of claim 10, wherein the notification includes at least one of: time to failure, industrial machine failure root cause, evolution of degradation events, information related to previous industrial machine failure.

14. The system of claim 10, wherein the system is further configured to:

determine a suitability score for the corrective solution recommendation, wherein the suitability score indicates a probability that the corrective solution recommendation will solve a forthcoming or existing second industrial machine failure.

15. The system of claim 10, wherein the second set of characteristics is determined to be similar to the first set of characteristics above a predetermined threshold based on a similarity function that provides a quantitative value representing the similarity between the two sets of characteristics.

16. The system of claim 10, wherein the at least a first industrial machine behavioral model is represented by a plurality of meta-models, where each of the plurality of meta-models is associated with a component of an industrial machine.

17. The system of claim 10, wherein the second set of characteristics is determined to be similar to the first set of characteristics using machine learning models.

* * * * *